A. MOFFATT.

Priming Cartridge.

No. 4,076. Reissued July 19, 1870.

WITNESSES:

Jos. T. Pender
Jas. H. Weiner

INVENTOR.

Arthur Moffatt

N. PETERS, Photo-Lithographer, Washington, D. C.

UNITED STATES PATENT OFFICE.

ARTHUR MOFFATT, OF WASHINGTON, DISTRICT OF COLUMBIA.

IMPROVEMENT IN PRIMING CARTRIDGES.

*Specification forming part of Letters Patent No.* 53,168, *dated March* 13, 1866; *reissue No.* 4,076 *dated July* 19, 1870.

*To all whom it may concern:*

Be it known that I, ARTHUR MOFFATT, of Washington, District of Columbia, have invented a certain Improvement in the Method of Priming Metallic Cartridges for Breech-Loading Fire-Arms, of which the following is a specification:

My invention relates to that description of cartridge in which the priming is placed and held in the center of the butt of the cartridge-case, and hence cartridges so primed are denominated "center-fire cartridges," the priming being placed in the interior of the case, between the butt and a metallic disk, or its equivalent, arranged in the case firmly against the butt, that serves as an anvil on which to explode the priming; and consists in interposing between the detonating compound constituting the priming and the butt of the cartridge a thin lamina of paper, or some other thin, flexible, non-metallic substance, and a similar lamina of like material between the said priming and the anvil, thus enveloping the priming in a material that will at once secure it in the center of the butt and protect it against the deteriorating effect upon it of the metal of the case and anvil.

Figure 1:
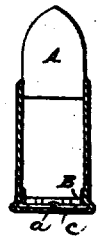
Figure 3:
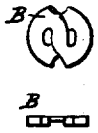
Figure 4:
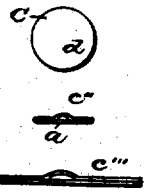
Figure 2:
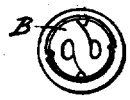
Figure 5:
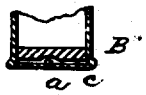
Figure 6:
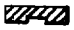

Figure 1 is a central sectional view of a completed cartridge containing my priming. Fig. 2 is an interior view of the butt of the cartridge having one form of anvil I employ in place in the case. Fig. 3 is one form of disk used by me which serves the purpose of an anvil on which to explode the priming in the cartridge. Fig. 4 is a face view of a priming and its envelope. Number 4′ is a cross-section of the same, and Fig. 4″ is the same enlarged. Figs. 5 and 6 are sectional views of an anvil formed of pressed gunpowder.

The cartridge-case A is made in the ordinary manner. For the priming this shell, in the center of the butt I insert and securely fasten therein an anvil, B, on which the priming may be exploded by a blow from the firing-pin or hammer of the gun delivered on the center of the butt of the case.

This anvil may be a disk of some suitable metal, having one or more perforations at or near its center to permit the fire of the priming, when exploded, to be transmitted to the propelling charge of gunpowder in the cartridge, and a small indentation may be made in the center of the anvil to receive the priming compound, which is to be placed in the center of and between the said anvil and the inner surface of the butt of the case.

It is well known that when any suitable detonating compound is placed as above described, between any suitable anvil and the cartridge-butt, in contact with either or both, and the adhesiveness of the said compound is alone relied upon to keep it in place at the center of the butt, such an arrangement is liable to two serious objections: First, the compound is liable to become broken up and displaced, thus sifting out of the cavity in which it is placed and spreading itself over the butt of the case, causing a liability to an accidental discharge of the cartridge and missing fire where intentional firing is attempted. Second, the immediate contact of the detonating compound with the metal of the anvil or the case is liable to deteriorate the explosive quality of the compound and occasion missing from that cause.

To obviate these objections, I interpose between the priming compound and the butt of the case on one side, and the anvil on the other, a thin lamina of paper, or some other thin, flexible, non-metallic material. This may be conveniently done as follows: Cut from the material used a small disk or patch, C, cover one side of it thinly with dissolved gum-arabic, or some similar adhesive substance. In the center of this disk or patch deposit a small mass of the priming compound A and cover it with another similar disk or patch of paper or other material, pressing the two together so that they will adhere, C″ and C‴. The priming thus prepared may then be covered on one or both sides with adhesive gum and placed in the butt of the case, and the anvil pressed down upon it, and securely fastened in the case by crimping or otherwise, as seen in Fig. 1. Or a large sheet of paper or other material may first be covered with gum, and at suitable distances apart small masses of the compound deposited on it. Another sheet may then be laid on the first, pressed down, and made to adhere to it. Then each mass of the compound, with enough of the paper covering and surrounding it to form a suitable disk or patch, may be cut out and used as a primer, as before described.

It is evident that the form of the anvil is not material. Instead of the metallic disk above described, one made of pressed gunpowder, as seen in Figs. 5 and 6, may be used, or it may be made of compressed paper, or, if of metal, it may be in the form of a cup.

My primer-wad, Figs. 4 and 4′, is applicable to any of these forms or descriptions of anvils.

I do not claim any of the parts of a cartridge above described taken separately; but What I do claim, and desire to secure by Letters Patent, is—

Interposing in the priming of a center-fire cartridge, between priming compound and the butt of the case A on one side, and the anvil B or its equivalent on the other, a thin lamina of paper or other thin, flexible material, substantially as and for the purpose herein specified.

ARTHUR MOFFATT.

Witnesses:
JOS. T. BENDER,
JAS. W. WISNER.